Oct. 13, 1931.   J. J. McCABE   1,827,093
MEASURING INSTRUMENT
Filed Feb. 9, 1925
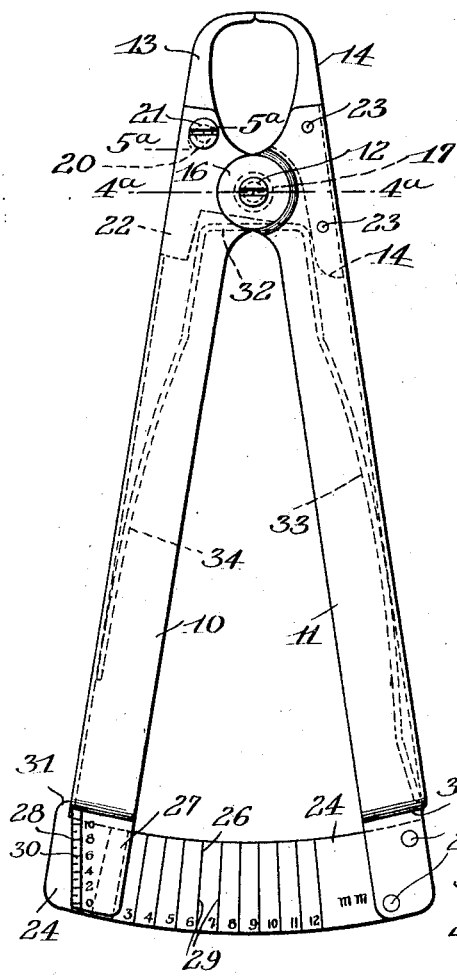
Fig.1
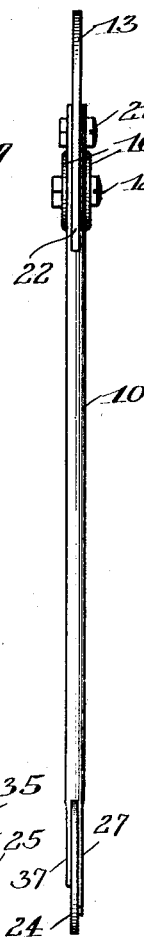
Fig.3
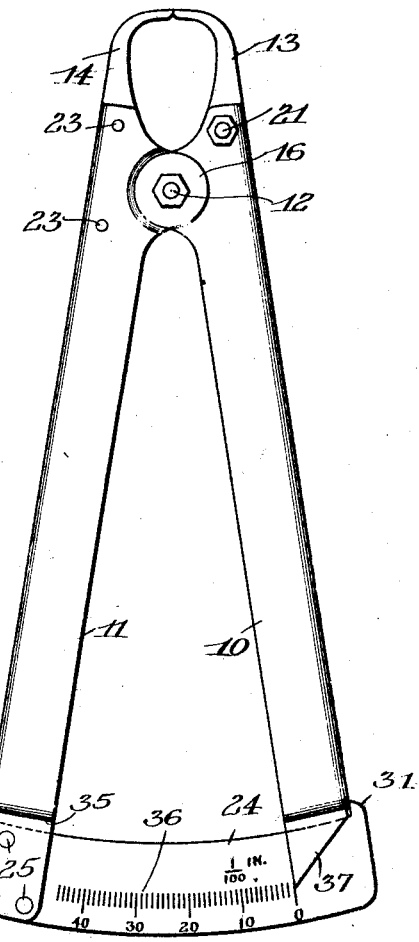
Fig.2
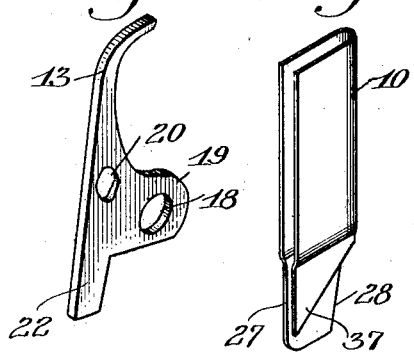
Fig.7   Fig.6
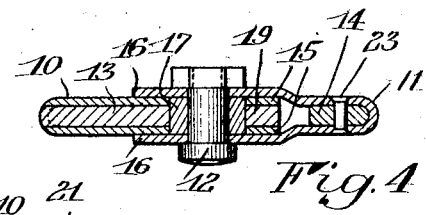
Fig.4
Fig.5
Inventor
Joseph J. McCabe Patented Oct. 13, 1931

1,827,093

UNITED STATES PATENT OFFICE

JOSEPH J. McCABE, OF ROCHESTER, NEW YORK, ASSIGNOR TO BAUSCH & LOMB OPTICAL COMPANY, OF ROCHESTER, NEW YORK, A CORPORATION OF NEW YORK

MEASURING INSTRUMENT

Application filed February 9, 1925. Serial No. 7,766.

The present invention relates to measuring instruments of the caliper type, embodying means for indicating the thickness or other dimensions of the articles to be measured and has for its object to improve instruments of this class.

A further object of the invention is to provide a practical, economical and convenient instrument of the above mentioned class including an improved jaw construction affording means for effecting relative adjustment of the jaws along with improved means for indicating the extent of their separation when in use.

To these and other ends the invention resides in certain improvements and combinations of parts, all as will he hereinafter more fully described, the novel features being pointed out in the claims at the end of the specification.

In the drawings:—

Figure 1 is a side elevation of a measuring instrument embodying the invention;

Figure 2 is an elevation showing the opposite side of the instrument to that shown in Figure 1;

Figure 3 is an elevation as viewed from the left of Figure 1;

Figure 4 is an enlarged sectional view taken on line 4a—4a of Figure 1;

Figure 5 is a sectional view taken on line 5a—5a of Figure 1;

Figure 6 is a perspective view illustrating the indicating portions of one of the arms of the instrument, and Figure 7 is a detailed perspective view of one of the jaws of the calipers.

Similar reference numerals throughout the several views indicate the same parts.

The present invention embodies a measuring instrument having a pair of arms 10 and 11 preferably channel shape which are connected by a pivot pin or bolt 12, the arms being provided with jaws 13 and 14 for engaging the opposite surfaces of the parts to be measured. The instrument is particularly adapted for measuring lenses or lens blanks, though useful for measuring other articles as well. The arm 10 is provided with inwardly projecting spaced ears 15 while the arm 11 is provided with correspondingly shaped ears 16, within which the ears 15 are disposed. A hardened bushing 17 is extended through the ears 15 and adapted to receive the pivot pin 12 as shown in Figure 4. The bushing is rigidly secured to the ears 15 in a suitable manner and extends through an opening 18 of an inwardly projected lug 19 on the jaw 13 whereby the bushing forms a pivot upon which said jaw is adapted to swing so that it may be adjusted relative to the arm 10 and relative to its normal position wi h respect to the jaw 14 for purposes hereinafter set forth. In mounting the jaw 13 upon the arm 10 the web portion of the channel is cut away at the jaw receiving end to permit the outer edge of the jaw to lie flush with the outer edge of the arm, as indicated in Figures 1 and 4. In order to afford the desired adjustment of the jaw it is provided with an opening 20, preferably elongated and adapted to receive a clamp screw or bolt 21 by which the opposite portions of the arm overlying the jaw are clamped thereon to hold the jaw in position to contact with the opposite jaw when the outer ends of the arms 10 and 11 are disposed at a predetermined distance apart. The jaw 13 is provided with an extension 22 in order to increase the length of the cut away portions of the channel web so as to afford greater resiliency of the parts of the arm 10 clamped upon the jaw and also to increase the contacting surfaces between the jaw and said parts whereby to more firmly hold the jaw in adjusted position.

The jaw 14 is preferably extended within the arm 11 and rigidly secured therein, by any suitable means, such as rivets 23.

The arm 11 is preferably bifurcated at its outer end to receive an extension in the form of an arcuate scale plate 24 suitably connected with the arm as by the rivets 25. The scale plate is formed on the arc of a circle concentric with the pivot 12 of the arms 10 and 11 and is graduated into equal units to provide a scale 26, marked in the present instance from zero to 12 to represent in millimeters the distance between the contact portions of the jaws. The outer end of the arm 10 adjacent the scale plate is bifurcated to embrace and move over the plate during relative pivotal movement of the jaws. The portion 27 of the arm is preferably formed on its outer side with a straight surface or edge 28 extending in a direction eccentric to the pivot 12, or in other words obliquely, or at an inclination with respect to the scale 26. That portion of the oblique surface 28 intersected between adjacent divisions 29 of the scale 26 is preferably divided into 10 parts, marked with the units zero to 10, forming indicia or a scale 30 for indicating fractional parts or tenths of the unit graduations on the main scale 26.

The scale plate 24 carries a stop lug 31 engaging the crotch of the bifurcated end of the arm 10 to limit its outward movement and to normally hold it at zero position, as shown in Figure 1.

A spring 32, including relatively long and short extensions or end portions 33 and 34, is interposed between the arms 10 and 11 to normally maintain them in the position shown in Figure 1, with the jaws 13 and 14 in contact and with the arm 10 in engagement with the stop 31.

It will thus be seen that the indicating parts of the instrument may be accurately constructed and so disposed with relation to each other as not to require subsequent adjustment. Said parts thus bear a fixed relation to each other, which cannot be varied and which therefor remains constant throughout the life of the instrument, whereby accuracy in the readings is assured. This is made possible by the use of the adjustable or relatively movable jaw 13 which can be readily set in contact with the opposite jaw at any time after the instrument is completed, thus permitting the points of the jaws to be reground after excessive wear and properly adjusted without detrimental effect upon the indicating parts of the instrument.

The spring 32 is so constructed as to be insertable within and removable from the channels of the arm without disconnecting the latter, removal being readily effected by inserting a pointed instrument behind the extended portions 33 and 34 of the spring and forcing them out of the channels and then moving the spring longitudinally of the arms in a direction away from the pivot 12 until the transverse portion of the spring reaches a point where it is of less width than the opening between the arms, from which point it may be readily withdrawn. With this arrangement, should the spring become broken, a new one may be readily inserted without removing the pivot pin 12. Longitudinal displacement of the spring is normally prevented by projecting the extended portion 33 thereof into engagement with a suitable abutment, preferably one formed by the shoulder portions 35 of the arm 11, produced by offsetting the sides of the channels inwardly to accommodate them to the thickness of the scale plate 24, which is of somewhat less thickness than the width of the channel opening.

Preferably both sides of the arm extension plate 24 are provided with scales, one as above described and the other as shown in Figure 2. In the latter case the scale indicated at 36 and extending from zero to 45 is divided into one-onehundredths inches, the arm 10 having a pointer 37 registering with the zero mark when the arm is in engagement with the stop 31, as previously described.

It is apparent from the above description of the construction that members 10 and 11 may be conveniently gripped in the hand and pressed toward each other to separate the jaws and then allowed to close under the action of the spring 32 to contact with the parts or surfaces of the object to be measured. The jaws are thus adapted to engage the objects to be measured with substantially uniform spring pressure and the spring also tends to maintain the contact points of the jaws in close engagement with the objects, thereby facilitating accurate manipulation of the instrument in use. By such setting of the contacts the oblique end portion 28 of member 10 is moved over the main scale 26 and the zero point of the scale 30 moves over the graduations of said main scale, thereby indicating on the latter the approximate dimensions to be determined, while the dimensions are more particularly or precisely shown by the oblique scale 30 which indicates at the point where it is intersected by the division line of the scale 26 the fractional part or a number of tenths to be added to the units indicated on the main scale to give the correct reading.

As apparent from the description and drawings, the construction is simple and economical to manufacture, comprising but a few parts, which are rigid and durable in character so that there is little likelihood of derangement of the parts in use. The calipers is therefore accurate within the degree of precision for which it is intended and the construction and arrangement of the parts provides an instrument which is not only convenient to manipulate in use but in which the unit and fractional indications are both made at the same time in a conveniently legible manner.

I claim as my invention:

1. In a measuring instrument, a pair of oppositely disposed arms extending in a common plane, a pivot member connecting said arms, jaws disposed upon said arms in said plane, one of which is adjustable to swing upon said pivot and relative to its supporting arm, means for holding the last mentioned jaw in adjusted position upon its arm, and yieldable means tending to thrust said arms apart, the arms having contact portions adapted to cooperate to limit their outward movement, one of the arms serving as an indicator and the other having a scale thereon, the zero point of which is in registry with the indicating portion of the other arm when said contact portions are in cooperating relation, the distance between the jaws being determined by the position upon the scale of said arm indicating portion.

2. In a measuring instrument, a pair of pivoted arms disposed in a common plane and provided with relatively adjustable jaws disposed in said plane and adapted for contact with the objects to be measured, one of the jaws being adjustable to swing in said plane relative to the arm with which it is connected, a clamping screw carried by the last mentioned arm for holding the adjustable jaw in different positions upon the arm, a plate carried by one of the arms and having scales of different unit systems on the opposite sides thereof, and indicating portions carried by the other arm and disposed upon the opposite sides of said plate for cooperation with said unit systems to indicate the thickness of the objects to be measured.

3. In a measuring instrument, a pair of pivoted arms extending in a common plane and having jaws thereon, one of which is adjustable to swing relative to the arm upon which it is mounted and in said plane, means for holding the last mentioned jaw in different positions of adjustment upon its arm, and means carried by said arms for indicating the distance between the jaws when the latter are in spaced relation.

4. In a measuring instrument, a pair of pivoted arms substantially U-shaped in cross section and extending in a common plane, jaws disposed within said arms and projecting therefrom in said plane, one of the jaws being adapted to swing relative to the arm in which it is mounted and having a slot therein, and a clamping member for holding the last mentioned jaw in different positions of adjustment extending through said slot and secured upon the arm in which said jaw is disposed.

5. In a measuring instrument, a pair of pivoted arms substantially U-shaped in cross section and extending in a common plane, jaws disposed within said arms and projecting therefrom in said plane, one of the jaws being adapted to swing about the pivotal axis of said arms and relative to the arm in which it is disposed, and means for holding the last mentioned jaw in different positions of adjustment upon the arm from which it projects.

6. In a measuring instrument, a pair of pivoted arms extending in a common plane, jaws disposed in said plane upon said arms, one of the jaws being adapted to swing to different positions of adjustment upon and relative to the arm upon which it is mounted, and means for holding said jaw in its different positions of adjustment.

7. In a measuring instrument, a pair of pivoted arms extending in a common plane, jaws disposed in said plane upon said arms, one of the jaws being adapted to swing in said plane about the pivotal axis of the arms and relative to the arm upon which it is mounted, a member for securing the last mentioned jaw in different positions of adjustment upon its arm, and means carried by said arms for indicating the distance between the jaws when the latter are in spaced relation.

8. In a measuring instrument, a pair of arms substantially U-shaped in cross section and extending in a common plane, a member pivotally connecting said arms, jaws disposed upon said arms in said plane, one of the jaws being adjustable to swing relative to the arm upon which it is disposed, means for holding said last mentioned jaw in different positions of adjustment, means carried by one of the arms adapted to be engaged by the other to limit their movement in one direction and a spring having connected portions extending longitudinally within said arms tending to force them apart, said spring being mounted independently of said pivotal member and detachably received within the arms.

JOSEPH J. McCABE.